Sept. 28, 1943.   P. A. McNALLY   2,330,603
ANGLE MEASURING INSTRUMENT
Filed Aug. 5, 1942   4 Sheets-Sheet 1
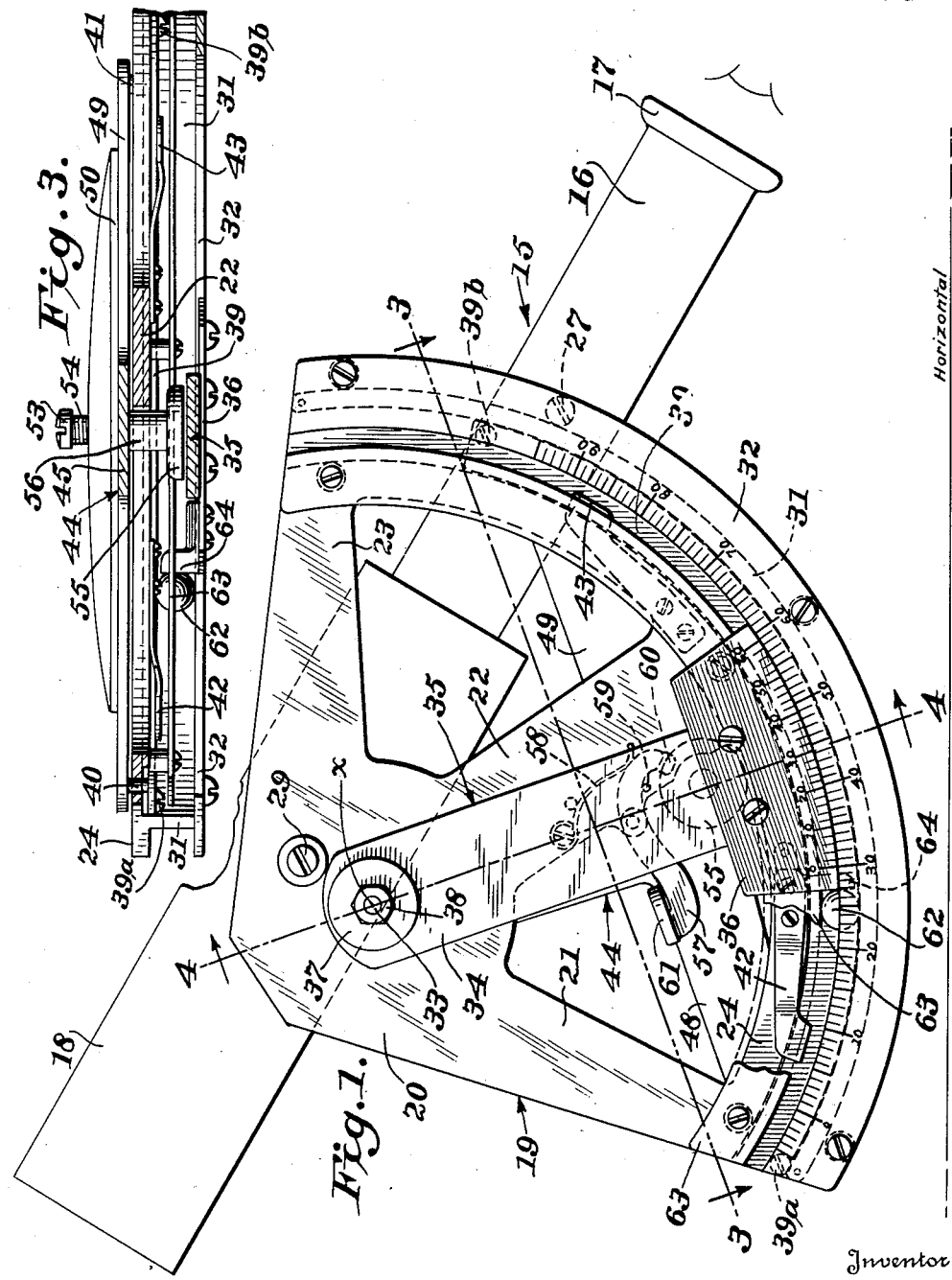
Inventor:
Paul H. McNally,
By Cushman, Darby & Cushman
Attorneys.

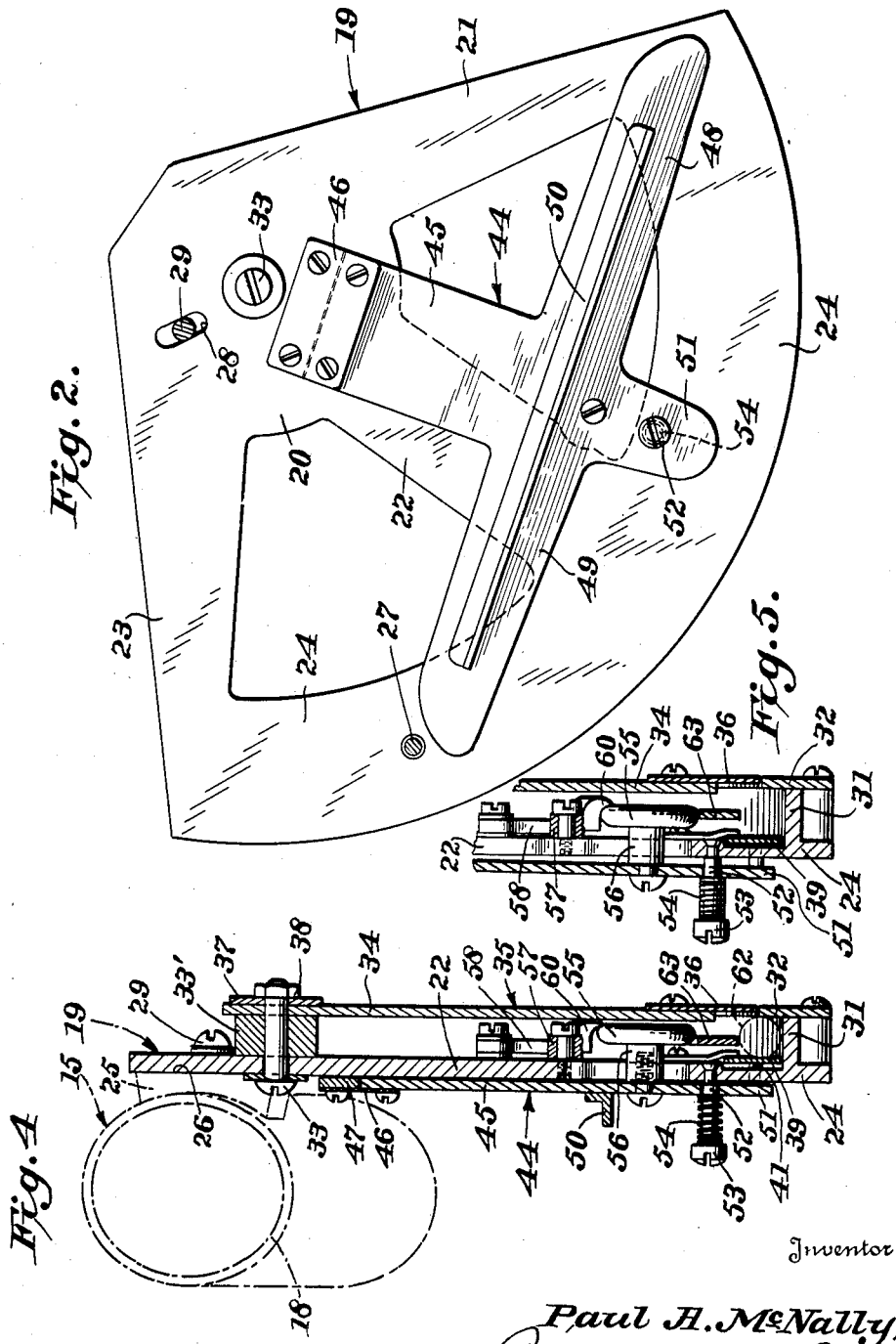

Sept. 28, 1943.　　　P. A. McNALLY　　　2,330,603
ANGLE MEASURING INSTRUMENT
Filed Aug. 5, 1942　　　4 Sheets-Sheet 3
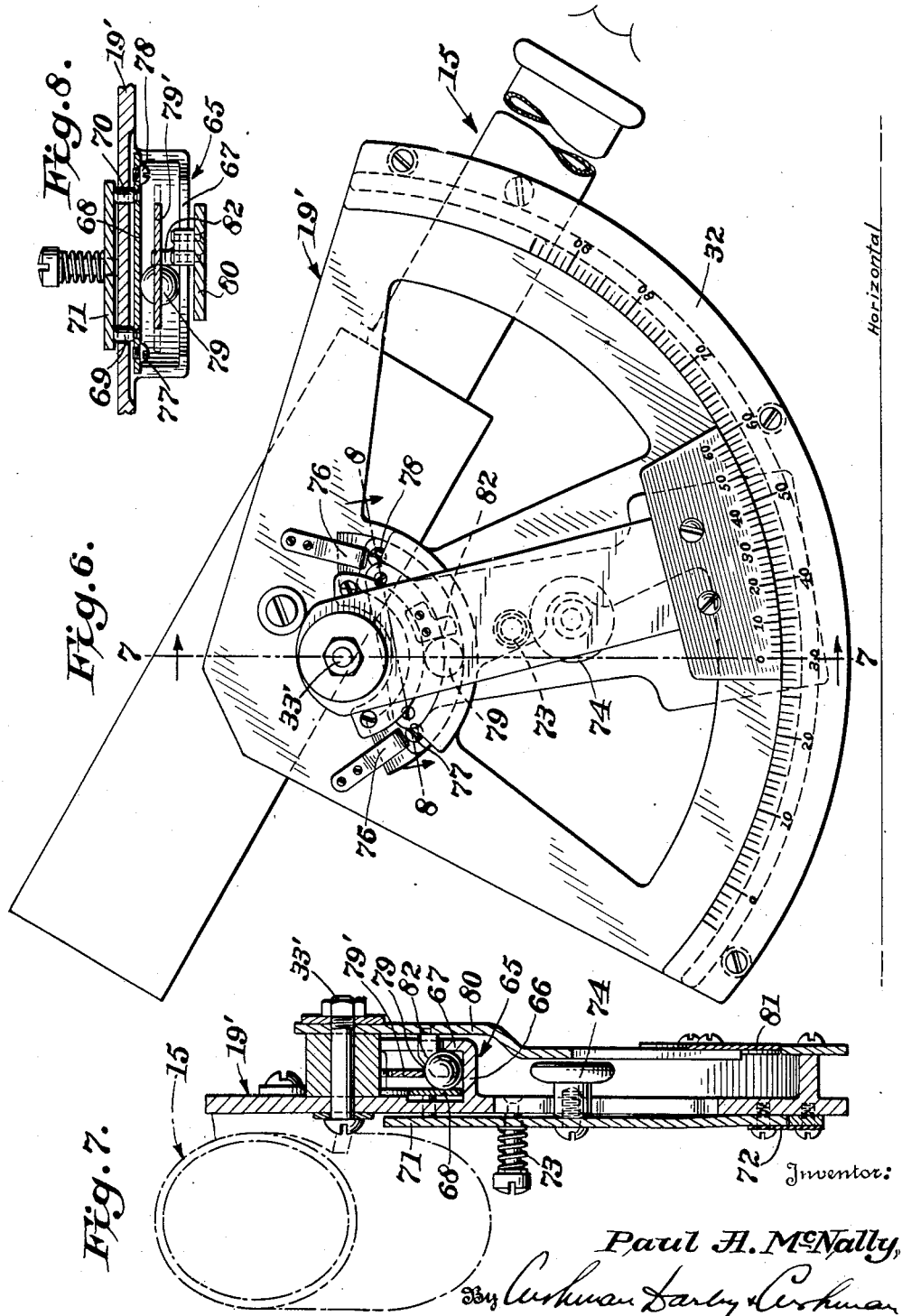
Inventor:
Paul H. McNally,
By Cushman Darby & Cushman
Attorneys Sept. 28, 1943.  P. A. McNALLY  2,330,603
ANGLE MEASURING INSTRUMENT
Filed Aug. 5, 1942  4 Sheets-Sheet 4
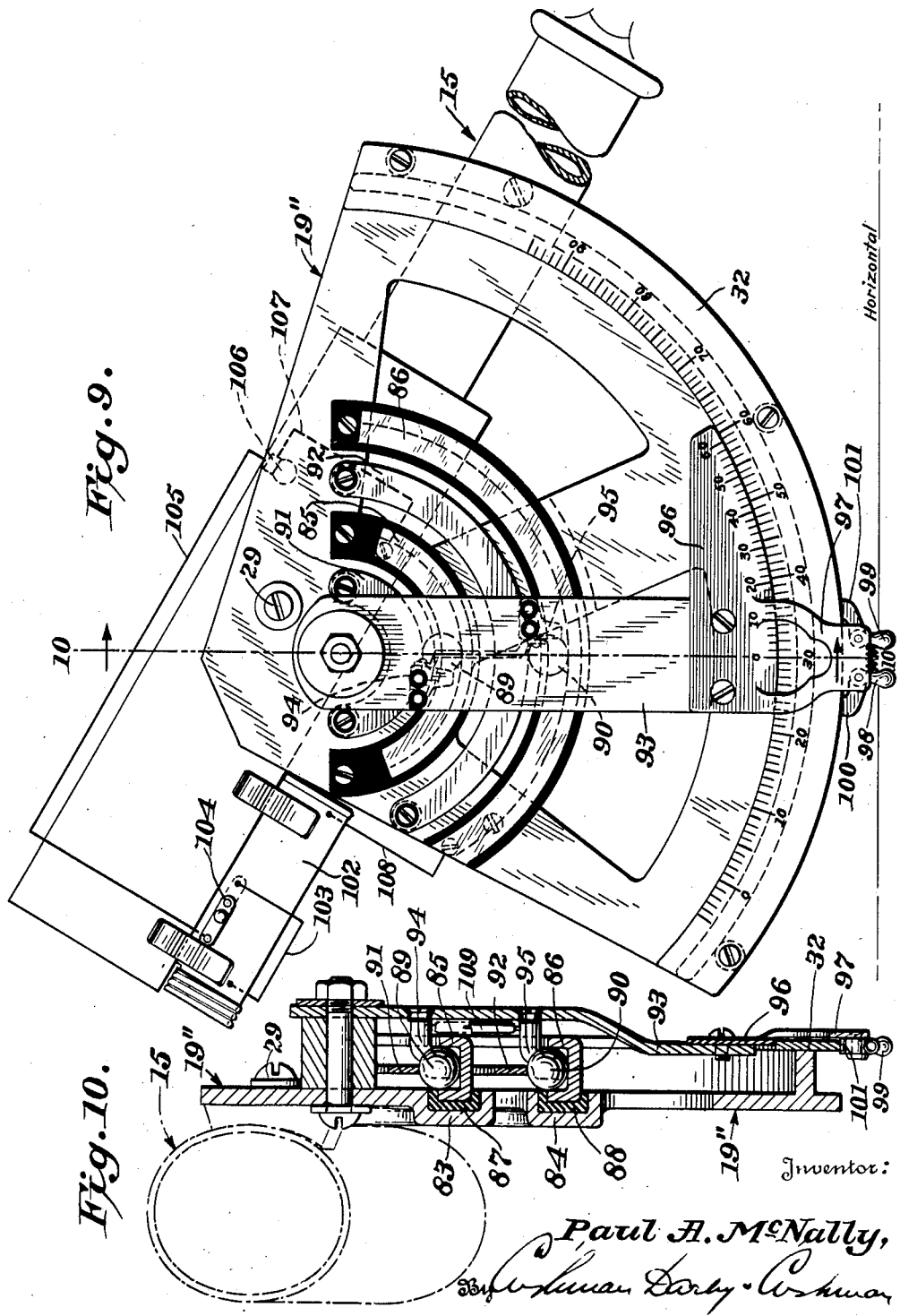
Inventor:
Paul A. McNally,
By Cushman Darby Cushman
Attorneys Patented Sept. 28, 1943

2,330,603

UNITED STATES PATENT OFFICE 2,330,603

ANGLE MEASURING INSTRUMENT

Paul A. McNally, Washington, D. C.

Application August 5, 1942, Serial No. 453,735

11 Claims. (Cl. 33—70)

This invention relates to an instrument adapted to measure the angle between an elevated object, for example a celestial body, and a horizontal line. A principal object of the invention is to provide an accurate instrument of such simplified construction as to enable it to be cheaply produced. A subsidiary object is to provide an instrument which will hold a setting for subsequent reading. Practical embodiments of the invention are shown by way of example in the accompanying drawings, in which:

Figure 1 is a side elevation or face view of the new instrument.

Figure 2 is a side elevation, opposite from that of Figure 1, of a portion of the device.

Figure 3 is a section substantially on line 3—3 of Figure 1.

Figure 4 is a section substantially on line 4—4 of Figure 1.

Figure 5 shows a fragment of Figure 4 with parts in different relation.

Figure 6 is a side elevation or face view of another form which the invention may take.

Figure 7 is a section substantially on line 7—7 of Figure 6.

Figure 8 is a section substantially on line 8—8 of Figure 6.

Figure 9 is a side elevation or face view of another embodiment of the invention, and Figure 10 is a section substantially on line 10—10 of Figure 9.

Referring first to Figures 1 to 5, reference numeral 15 designates generally sighting means which may be of any suitable design. The tubular sighting member here shown by way of example may be a telescope or a simple sighting tube with a peep hole for the eye of the observer and cross wires. The illustrated sighting tube comprises a cylindrical portion 16 provided with an eye piece 17 and an aligned enlarged cylindrical portion 18.

Reference numeral 19 generally designates a segment having an inner portion 20, radial arms 21, 22 and 23 and an outer portion or rim 24. Fixed on portion 18 of the sighting tube is a block 25 (Fig. 4) having a face 26 in a plane parallel to the tube axis and a similar block, not shown, having a face co-planar with the face 26, is fixed on portion 16 of the sighting tube. The latter block has a threaded bore intersecting the axis of the sighting tube and in which is threaded a screw 27, Figures 1 and 2, which passes through a bore provided in rim 24. The inner portion 20 of the segment is provided with a slot 28, Figure 2, arcuate on the axis of screw 27 and receiving a screw 29 threaded into the block 25 on an axis intersecting the tube axis, as here shown. With the segment thus associated with the sighting tube, it may be adjusted throughout a certain angular extent, as permitted by slot 28, about the screw 27 for the purpose of securing proper relationship.

The outer edge of rim 24 is arcuate about an axis $x$ on the inner portion 20 of the segment and spaced from this edge and integral therewith is a coaxial flange 31 to which is secured an arcuate scale bar 32, whose inner edge has the point $x$ as its axis. The upper marginal portion of the scale bar projects above flange 31, as appears in Figure 4. The scale bar 32 is here shown as a quadrant, but this is merely by way of illustration, since the angular extent of the bar is immaterial to the invention, which is equally applicable to sextants, octants, etc.

Portion 20 is pierced on the axis $x$ to receive a bolt 33 which serves as a pivot for the arm 34 of a pointer generally designated by the reference numeral 35, a spacer 33' being interposed between the segment and the arm. As here shown, the pointer carries a vernier 36 for cooperation with the scale bar, but it will be understood that the invention is not limited in this respect, and that any suitable indicating means for cooperation with the scale bar may be used. A spring washer 37 is interposed between the nut 38 and arm 34 so that the pointer will be retained in any angular position about its axis.

A rigid arcuate strip 39, coaxial with the scale bar 32, is supported just clear of flange 31 by means of a pair of studs 40 and 41 slidable in holes in the rim 24 as most clearly seen in Figures 3 and 4, and is pressed toward rim 24 by leaf springs 42 and 43 secured to the rim above the strip with their free ends bearing against the upper marginal portion of the strip face, Figures 1, 3 and 4. The studs have a length greater than the thickness of the rim. A cruciform member 44, which appears as a whole in Figure 2, has a foot portion 45 hinged by means of a flexible metal strip 46 to a block 47 fixed on the back of portion 20 of the segment, and has arms 48 and 49 whose ends lie against the rear ends of studs 40 and 41. The arms are stiffened by an angle 50 extending lengthwise thereof. Member 44 has a head portion 51 pierced to pass a pin 52 fixed to the rim 24, the pin having a head 53 between which and portion 51 is interposed a compression spring 54 whose force is greater than the combined force of leaf springs 42 and 43 so that strip 39 is normally urged toward the scale bar 32. A button 55 is secured to member 44 through a shank 56 which is disposed to one side of arm 22. By pressing on button 55, the force of spring 54 is overcome so that springs 42 and 43 are enabled to move strip 39 toward and against the face of rim 24. Pivoted on arm 22 is a latch 57 normally pressed by a spring 58 against a stop 59. The latch has a nose portion 60, most clearly shown in Figure 5, such that when the button 55 is depressed, the nose portion will snap over the button to retain the latter in depressed position, the latch being releasable by depressing a finger piece 61, Figure 1, to permit spring 54 to return strip 39 toward the scale bar 32.

Flange 31, that portion of the scale bar 32 projecting above the flange, and strip 39, define a channel or runway for a ball 62 which is desirably constituted by a ball bearing. The height of said projecting portion of the scale bar is somewhat greater than the radius of the ball. The diameter of the ball is such that it is normally clamped between the scale bar 32 and the movable wall 39 due to the action of spring 54, Figure 4, but is free to roll in the channel or runway when the button 55 is depressed as in Figure 5. In order to prevent the ball from jumping out of the runway, an arcuate rail 63 is secured to rim 24 and extends above the runway just clear of the ball. Also, stops 39a and 35b are provided adjacent the ends of strip 39.

Fixed on the back side of the vernier 36 and projecting into the runway to the right of the ball, Figures 3 and 4, is a stop 64 having a radial face here shown as flush with the radial left hand edge of the vernier. In the original assembly of the device, the sighting tube is fixed on a horizontal axis with the segment in a vertical plane, whereupon the ball 62 will come to rest with its center in a vertical line passing through the axis x. The arm is swung clockwise so that stop 64 just touches the ball. The scale bar 32 is then fixed so that its zero mark is aligned with the zero mark on the vernier. With the stop 64 arranged as above mentioned with respect to the vernier, this means that the zero mark on the scale 32 will be to the right of the vertical by a distance equal to the radius of the ball plus the distance between the left hand edge of the vernier and its zero mark. Obviously, if the stop 64 is spaced to the right on the vernier by this same distance, the scale 32 will be disposed so that its zero mark will lie in a vertical line including the center of the ball and the axis x.

In Figure 1 it is assumed that the sighting tube is directed on the object whose angle of elevation is to be determined. The segment 19 is in a vertical plane with the scale bar below the sighting tube and extending to both sides of the vertical. The pointer is swung in a counterclockwise direction so as to be out of the way and the ball is locked in the runway, say at the 80° mark or thereabouts. The ball is now released by pressing button 55 to the position of Figure 5, wherein it is retained by the latch 57. The ball freely runs down the runway and after a short period of oscillation, comes to rest with its center on the vertical radius of the scale bar. The latch is now released so that strip or wall 39 clamps the ball against the scale bar, springs 42 and 43 at this time acting as damping means for spring 54. The pointer 35 is now swung down until abutment 64 comes into contact with the ball. The instrument may now be lowered and the reading taken at leisure.

It will be seen that the various elements of the described instrument may be quickly made and assembled. The segment 19 is cheaply stamped from plate metal and the same applies to most of its associated parts. The ball is readily obtainable on the market in desired size. I prefer to use a ball somewhat larger than that shown in the drawings since a ball of one-half inch diameter, for example, will come to rest more quickly than a lighter ball. Also, to this end, the ball runway may be on a smaller radius and in this connection attention is directed to Figures 6 to 8.

In the last mentioned figures, the sighting tube 15 is the same as before and the segment 19' is generally the same as the segment 19 and supports the same scale 32. The segment 19' is specifically different in that it is formed with an L formation 65 adjacent the pivot 33', this formation including a bottom wall 66 arcuate on the axis of pin 33', and a side wall 67. A channel or runway is completed by a movable inner arcuate side wall 68 mounted on studs 69 and 70 which project through the segment in the manner particularly shown in Figure 8 and are engaged by a member 71 pivoted at its lower end at 72 to the segment and pressed against the studs by a spring 73 and carrying a button 74. Pins 69 and 70 are held against member 71 by leaf springs 75 and 76, as particularly shown in Figure 6. The runway is included in the angle which includes the scale bar. Wall 68 is provided at its ends with stops 77 and 78 to limit the travel of the ball 79 in the runway and an arcuate rail 79' extends just above the ball to prevent it from falling out of the runway when the latter is in a position other than upright.

The arm 80 of the pointer is offset, as shown in Figure 7, in order to clear the formation 65 and at its lower end carries the vernier 81 which cooperates with the scale 32. The arm has fixed thereon an abutment 82 for cooperation with the ball. The disposition of the abutment on the arm and the relation of the vernier to the scale are such that when the axis of the sighting tube is horizontal, a vertical line intersecting the swinging axis of the arm passes through the center of the ball and the zero mark on the scale 32, and if the zero mark of the vernier is in register with the zero mark of scale 32, stop 82 will be just in contact with the ball. The use of the instrument is the same as described with reference to the first form. The pointer is swung so that the abutment is out of the way of the ball, and when the object is sighted, the ball is released and quickly comes to rest on the lowest point of its runway. The pointer is returned until the abutment touches the ball, and the reading taken.

In Figures 9 and 10, the sighting tube 15 is the same as in the other figures, and in the same manner supports a segment 19" carrying a scale bar 32. The segment is formed with arcuate depressions 83 and 84 which are coaxial with the scale bar and support coaxial upwardly open channels 85 and 86, the channels being of electrically conductive material and insulated from the segment and from each other by insulating channels 87 and 88, the channels being included in the angle which includes the scale bar. Ball bearings 89 and 90 are freely rollable in the channels, and are retained therein by rails 91 and 92 spaced slightly above them and by suitable end stops.

The pointer arm 93 carries conductive abutments 94 and 95, respectively cooperable with balls 89 and 90. When the balls are vertically aligned, the abutment 94 will just touch the left hand side of the ball 89 and the abutment 95 will just touch the opposite or right hand side of ball 90. Arm 93 carries the vernier 96 and has an extension 97 to which are pivoted two bell crank levers 98 and 99 which are forced apart by a compression spring so that normally their portions 100 and 101 are urged against the outer arcuate edge of the scale 32 as brakes so that the pointer is frictionally held in desired relation to the scale. By pressing the handle portions of the bell crank levers toward each other, the brake portions 100 and 101 are released from the scale so that the pointer can be freely angularly adjusted.

Reference numeral 102 designates a battery casing secured below the sighting tube and carrying a battery of which one pole is led by a conductor 103 to a switch 104 and thence through a conductor 105 to one terminal of a lamp 106, which may be conveniently disposed in an out of the way, yet visible, position in the sighting tube, as indicated. The other terminal of the lamp is connected by a wire 107 with channel 85. The other pole of the battery is connected through a wire 108 to the channel 86. The abutments 94 and 95, which are insulated from the pointer arm 95, as indicated in Figure 10, are connected together through a conductor 109.

In the use of this instrument, when the object has been sighted, the pointer arm 93 is moved to bring both of its abutments into contact with the balls. Switch 104 being closed, light 106 will show steadily if the balls are in true vertical alignment. When this occurs, the bell crank levers are released, thus locking the pointer relative to the scale for a reading.

The described embodiments all utilize a ball or balls as the primary angle locating means, since a ball moves with the least possible friction and will come to rest on its arcuate runway with the least possible deviation from the vertical radius of the runway. In the first embodiment the reading could be taken with reference to the ball but by using the ball as locating means for the pointer the reading is made much simpler and more accurate. In the embodiment of Figures 9 and 10 a reading could be made by very carefully bringing a pointer abutment against its associated ball without moving the latter after it has come to rest on the vertical radius. The reading is much simplified, however, by the provision of the two balls and abutments as shown.

From what has been described, it will be evident that the invention is susceptible of varied embodiment. Other variations in the form and arrangement of parts are contemplated under the claims which follow.

I claim:

1. A measuring device for vertical angles, comprising sighting means, an arcuate scale bar in connection with said sighting means, the axis of said scale bar being perpendicular to an axial plane of said sighting means, the bar being in a vertical plane and extending in both directions beyond a vertical line intersecting the bar axis when the sighting means is in sighting position, a pointer movable along said bar; and means for locating said pointer for a reading with reference to said bar, including an arcuate runway coaxial with said bar and substantially included in the angle which includes said bar, a ball adapted during sighting to assume a position in said runway in which the center of the ball lies on the vertical radius of the runway, and an abutment portion on the pointer adapted to abut the thus positioned ball.

2. A measuring device for vertical angles, comprising sighting means, an arcuate scale bar in connection with said sighting means, the axis of said scale bar being perpendicular to an axial plane of said sighting means, the bar being in a vertical plane and extending in both directions beyond a vertical line intersecting the bar axis when the sighting means is in sighting position, a pointer movable along said bar; and means for locating said pointer for a reading with reference to said bar, including a pair of arcuate runways coaxial with said bar and substantially included in the angle which includes said bar, said runways being of electrically conductive material and insulated from each other, an electrically conductive ball in each runway, electrically conductive abutments carried by the pointer and disposed so that when the balls are vertically aligned one abutment will contact one side of one of said balls and the other abutment will contact the opposite side of the other of said balls; and a signal circuit including said runways, balls, and abutments, said circuit being adapted to be closed to provide a signal when the balls are both in contact with their abutments.

3. A device according to claim 2 wherein releasable locking means is carried by the pointer so that when released the pointer can be freely moved along said bar and when locked the setting of the pointer can be subsequently read, said locking means when grasped for release serving as means by which the pointer is movable.

4. A measuring device for vertical angles, comprising sighting means, an arcuate scale bar in connection with said sighting means, the axis of said scale bar being perpendicular to an axial plane of said sighting means, the bar being in a vertical plane and extending in both directions beyond a vertical line intersecting the bar axis when the sighting means is in sighting position, a pointer movable along said bar; and means for locating said pointer for a reading with reference to said bar, and including an arcuate runway coaxial with said bar and substantially included in the angle which includes said bar, a ball adapted during sighting to assume a position in said runway in which the center of the ball lies on the vertical radius of the runway, said runway including opposite walls of which one is movable toward and away from the other to lock or to release the ball, and an abutment portion on the pointer cooperable with the ball.

5. A measuring device for vertical angles, comprising sighting means, an arcuate scale bar in connection with said sighting means, the axis of said bar being perpendicular to an axial plane of said sighting means, the bar being in a vertical plane and extending in both directions beyond a vertical line intersecting the bar axis when the sighting means is in sighting position, an arcuate runway coaxial with said bar and substantially included in the angle which includes said bar, a ball in said runway, said runway including opposite walls of which one is movable toward and away from the other to lock or to release the ball, spring means normally holding the movable wall in locking position, and damping means opposing the action of said spring means.

6. A measuring device for vertical angles, comprising sighting means, an arcuate scale bar in connection with said sighting means, the axis of said bar being perpendicular to an axial plane of said sighting means, the bar being in a vertical plane and extending in both directions beyond a vertical line intersecting the bar axis when the sighting means is in sighting position, an arcuate runway coaxial with said bar and substantially included in the angle which includes said bar, a ball in said runway, said runway including opposite walls of which one is movable toward and away from the other to lock or to release the ball, spring means normally holding the movable wall in locking position, and readily releasable latch means arranged to hold said movable wall in releasing position.

7. A measuring device for vertical angles, comprising sighting means, an arcuate scale bar in connection with said sighting means, the axis of said bar being perpendicular to an axial plane of said sighting means, the bar being in a vertical plane and extending in both directions beyond a vertical line intersecting the bar axis when the sighting means is in sighting position, an arcuate runway coaxial with said bar and substantially included in the angle which includes said bar, a ball in said runway, said runway including opposite walls of which one is movable toward and away from the other to lock or to release the ball, spring means normally holding the movable wall in locking position, readily releasable latch means arranged to hold said movable wall in releasing position, and damping means opposing the action of said spring means.

8. A measuring device for vertical angles, comprising sighting means, an arcuate scale bar in connection with said sighting means, the axis of said bar being perpendicular to an axial plane of said sighting means, the bar being in a vertical plane and extending in both directions beyond a vertical line intersecting the bar axis when the sighting means is in sighting position, an arcuate upwardly open channel having side walls of which one is constituted by said bar, and a ball in said channel, the other side wall of said channel being movable toward and away from the first whereby to lock the ball at any point in said channel or to release it for free rolling movement in said channel, and a pointer movable along said bar and carrying means projecting into said channel and adapted to abut the locked ball whereby to locate the pointer for a reading with reference to said bar.

9. A measuring device for vertical angles, comprising sighting means, an arcuate scale bar in connection with said sighting means, the axis of said bar being perpendicular to an axial plane of said sighting means, the bar being in a vertical plane and extending in both directions beyond a vertical line intersecting the bar axis when the sighting means is in sighting position, an arcuate upwardly open channel having side walls of which one is constituted by said bar, a ball in said channel, the other side wall of said channel being movable toward and away from the first whereby to lock the ball at any point in said channel or to release it for free rolling movement in said channel, spring means normally holding said movable wall in locking position, and readily releasable latch means arranged to hold said movable wall in releasing position.

10. A measuring device for vertical angles, comprising sighting means, an arcuate scale bar in connection with said sighting means, the axis of said bar being perpendicular to an axial plane of said sighting means, the bar being in a vertical plane and extending in both directions beyond a vertical line intersecting the bar axis when the sighting means is in sighting position, an arcuate upwardly open channel having side walls of which one is constituted by said bar, a ball in said channel, the other side wall of said channel being movable toward and away from the first whereby to lock the ball at any point in said channel or to release it for free rolling movement in said channel, spring means normally holding said movable wall in locking position, readily releasable latch means arranged to hold said movable wall in releasing position, and damping means opposing the action of said spring means.

11. A measuring device for vertical angles, comprising sighting means, an arcuate scale bar in connection with said sighting means, the axis of said bar being perpendicular to an axial plane of said sighting means, the bar being in a vertical plane and extending in both directions beyond a vertical line intersecting the bar axis when the sighting means is in sighting position, an arcuate runway coaxial with said bar and substantially included in the angle which includes said bar, a ball in said runway, means for locking the ball at any point in said runway, and a pointer movable along said bar, said pointer including a portion adapted to abut said ball where the latter is locked whereby to give a reading with reference to said bar as determined by the position of said ball.

PAUL A. McNALLY.